United States Patent
Grossman

[11] Patent Number: 5,829,767
[45] Date of Patent: Nov. 3, 1998

[54] KNOCK-DOWN CART

[76] Inventor: Glenn D. Grossman, 5151 Commerce Ave., Moorpark, Calif. 93021

[21] Appl. No.: 612,323

[22] Filed: Mar. 7, 1996

[51] Int. Cl.[6] .................................................. B62B 3/00
[52] U.S. Cl. ................................. 280/47.35; 312/249.11; 312/330.1
[58] Field of Search ............................... 280/79.3, 47.35; 296/22; 211/41.1, 41.2, 126.2, 126.6, 132.1, 135, 126.11, 126.12; 312/287, 249.11, 351.11, 286, 400, 406, 263, 330.1

[56] References Cited

U.S. PATENT DOCUMENTS

| | | |
|---|---|---|
| 1,676,930 | 7/1928 | Schmitz . |
| 2,104,912 | 1/1938 | Streeter ................................ 211/135 X |
| 2,461,219 | 2/1949 | Lew . |
| 2,959,298 | 11/1960 | Pope . |
| 2,989,193 | 6/1961 | Smith, Jr. . |
| 3,052,363 | 9/1962 | Foote, Jr., et al. .................. 312/287 X |
| 3,153,698 | 10/1964 | Maddox . |
| 3,222,117 | 12/1965 | Schwartz . |
| 3,522,954 | 8/1970 | Locke . |
| 3,580,602 | 5/1971 | Hebert . |
| 3,655,063 | 4/1972 | Landry . |
| 3,891,228 | 6/1975 | Rhinehart et al. .................. 280/79.3 X |
| 3,927,769 | 12/1975 | Maslow et al. . |
| 3,963,125 | 6/1976 | Baggott . |
| 3,967,734 | 7/1976 | Morgan et al. . |
| 4,113,329 | 9/1978 | Thurman . |
| 4,295,693 | 10/1981 | Viklund . |
| 4,588,096 | 5/1986 | Story et al. . |
| 4,600,231 | 7/1986 | Sickles .................................... 294/161 |
| 4,679,711 | 7/1987 | Noren . |
| 4,709,642 | 12/1987 | Briosi . |
| 4,725,066 | 2/1988 | Nootenboom et al. . |
| 4,753,356 | 6/1988 | Nootenboom et al. . |
| 5,040,690 | 8/1991 | van der Schoot . |
| 5,069,466 | 12/1991 | Propst . |
| 5,240,320 | 8/1993 | Yerman .............................. 312/351.11 |
| 5,259,668 | 11/1993 | Teufel ................................ 312/249.11 |
| 5,267,742 | 12/1993 | Reinkemeyer . |
| 5,330,060 | 7/1994 | Bohner . |

*Primary Examiner*—Robert Oberleitner
*Assistant Examiner*—Tyrone M. Lee
*Attorney, Agent, or Firm*—Knobbe, Martens Olson & Bear, LLP

[57] ABSTRACT

A knock-down cart has a generally rectangular box-like structure having two side panels and at least two columns of vertically spaced horizontal ledges struck out inwardly from each of the side panels. The side panels are reinforced and stiffened by a C-shaped bracket attached between each side panel and a corresponding outer panel. A bottom wheel mount is provided for mounting caster wheel units to a bottom panel. The cart has a simple construction, and is sturdy, easy to use, and adapted to receive modular containers and shelves in a variety of arrangements.

26 Claims, 3 Drawing Sheets

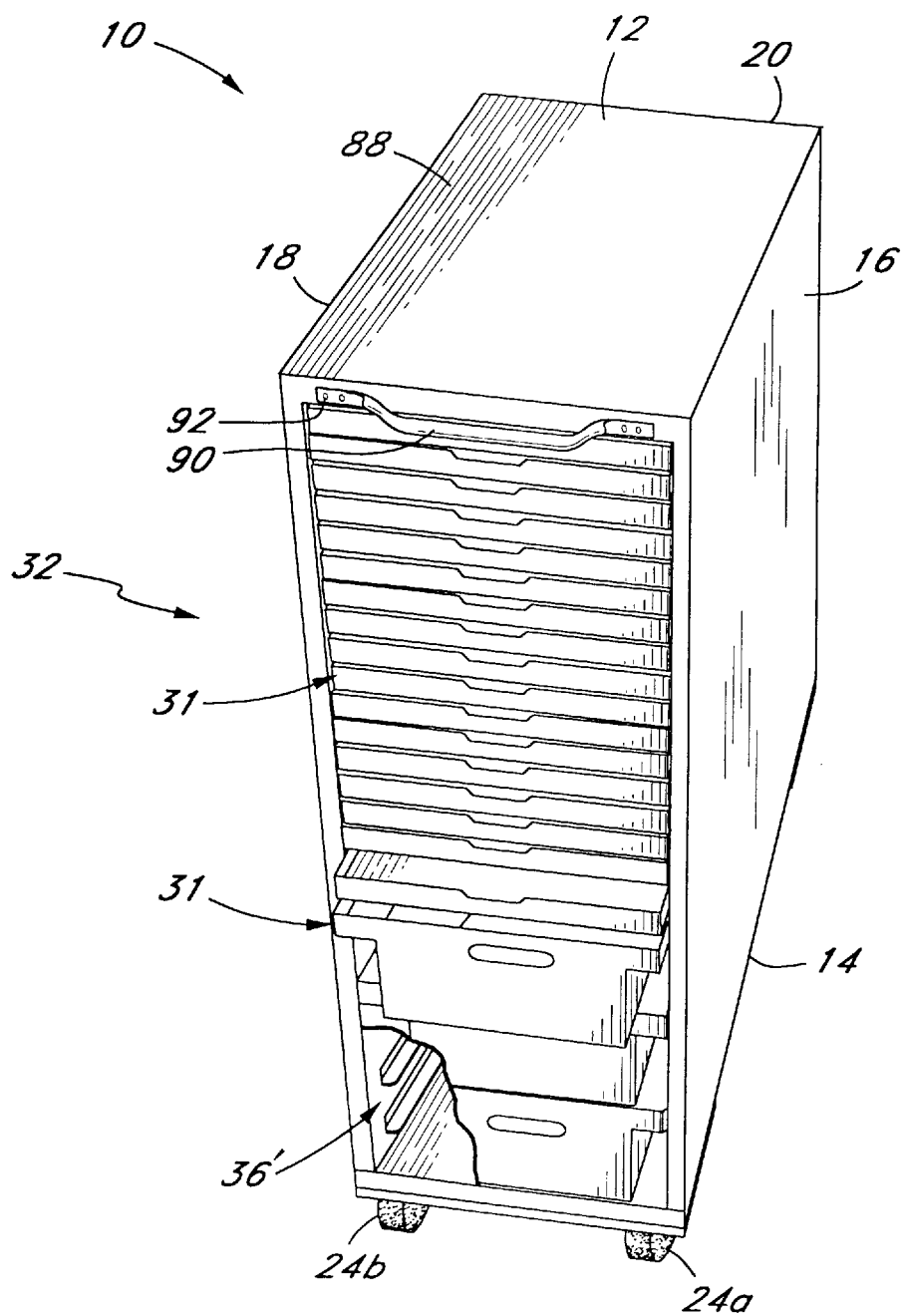

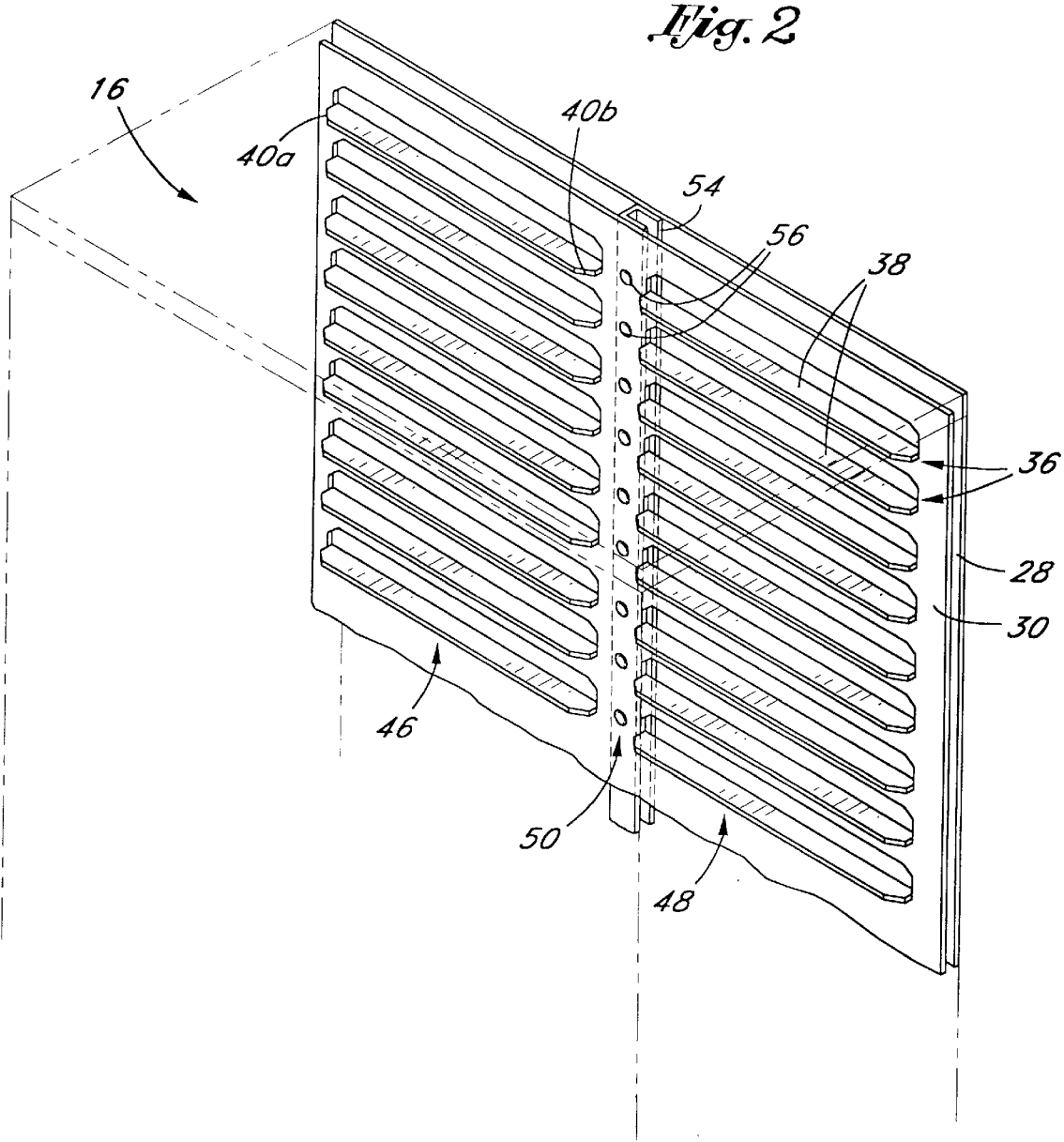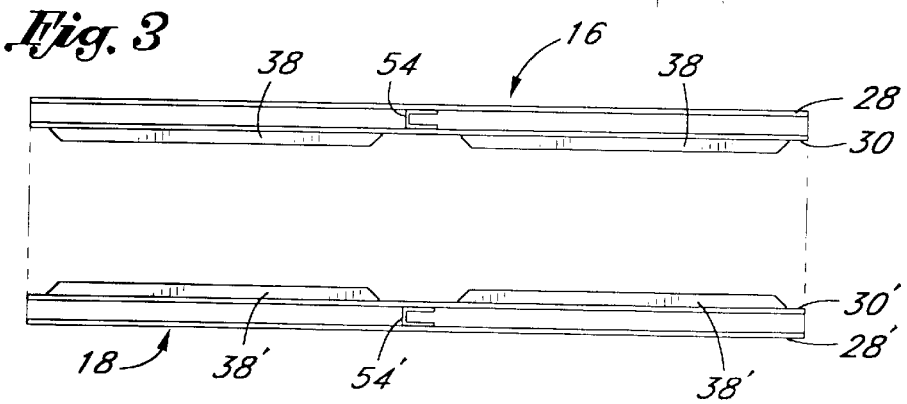

KNOCK-DOWN CART

FIELD OF THE INVENTION

This invention relates to a cart for storing and transporting products, product parts, and the like.

BACKGROUND OF THE INVENTION

Carts and tray racks of various types are known in the art, and are used in various institutional and commercial establishments. In designing a cart, there is tradeoff among various factors including cost, strength, simplicity, utility, adaptability, and ease of use. Carts that are economical often lack sturdiness and strength. A simple cart that is easy to use is often limited in utility and not adaptable to a variety of applications.

There is a need, therefore, for a cart of simple construction which is strong, easy to use, and adapted to receive modular trays, containers, shelves, and other articles in a variety of arrangements.

SUMMARY OF THE INVENTION

The present invention provides a simple yet sturdy cart that is adaptable and easy to use. In one aspect of the present invention, a cart comprises a generally rectangular bottom panel, a generally rectangular top panel, and two vertical side panel assemblies. The bottom panel has four corners and bottom wheel mounts adjacent the corners with wheels mounted thereon. The top panel is spaced above the bottom panel. The vertical side panel assemblies are disposed opposite each other, extending between and connected to the top and bottom panels. Each of the side panel assemblies has an outer side panel spaced from an inner side panel and a stiffener disposed between the outer and inner side panels. Each of the inner side panels is formed of planar sheet material and has two vertical columns of support members. The columns comprise horizontal ledges struck out inwardly from the sheet material of the inner side panel. The columns are horizontally spaced from each other, forming a vertical strip of the inner side panel between the columns.

Another aspect of the present invention involves a cart comprising a top panel, a bottom panel spaced below the top panel, and two side wall assemblies opposite each other. The side wall assemblies extend between and are connected to the top and bottom panels. Each of the side wall assemblies includes a support panel formed of planar sheet material and at least two columns of vertically spaced horizontal ledges struck out inwardly from the sheet material of the support panel. The ledges are adapted to receive and support edges of articles inserted between the inner side panels. Any adjacent two of the columns are separated by a planar strip of the sheet material. Each planar strip has an elongated stiffener attached thereto and extending between and connected to the top and bottom panels.

Yet another aspect of this invention is a cart comprising receiving means for receiving a plurality of articles, support means for supporting edges of the articles, and reinforcing means for reinforcing the support means. The support means includes vertically spaced horizontal ledges arranged into a plurality of horizontally spaced sections.

In accordance with another aspect of this invention, a method for making a cart comprises forming a bottom panel, attaching a plurality of wheels to a bottom side of the bottom panel, forming a top panel and disposing the top panel above the bottom panel, forming a right-side panel assembly which extends between the top panel and the bottom panel, attaching the right-side panel assembly to the top panel and the bottom panel, forming a left-side panel assembly which extends between the top panel and the bottom panel, and attaching the left-side panel assembly to the top panel and the bottom panel. The right-side panel assembly comprises an outer right-side panel spaced from an inner right-side panel and a right-side stiffener disposed between and attached to the outer and inner right-side panels. The inner right-side panel has two right-side columns of support members. The right-side columns are horizontally spaced from each other and form a right-side strip of the inner right-side panel therebetween. The left-side panel assembly comprises an outer left-side panel spaced from an inner left-side panel and a left-side stiffener disposed between and attached to the outer and inner left-side panels. The inner left-side panel has two left-side columns of support members. The left-side columns are horizontally spaced from each other and form a left-side strip of the inner right-side panel therebetween.

Another aspect of the present invention involves a method of making a cart comprising the following steps. A first external panel and a first internal panel are formed. The first internal panel is spaced inwardly from the first external panel, being generally parallel thereto. At least two columns of vertically spaced horizontal ledges are struck out inwardly from the first internal panel. Any adjacent two of the columns are separated by a planar strip of the first internal panel. The first internal and external panels are coupled by at least one stiffening member disposed therebetween. A second external panel is formed and spaced from the first internal and external panels. A second internal panel is formed and spaced inwardly from the second external panel toward the first internal panel, being generally parallel to the second external panel. At least two columns of vertically spaced horizontal ledges are struck out inwardly from the second internal panel. Any adjacent two of the columns are separated by a planar strip of the second internal panel. The second internal and external panels are coupled by at least one stiffening member disposed there between. A top panel is formed extending between and connected to the first internal and external panels and to the second internal and external panels. A bottom panel spaced below the top panel is formed extending between and connected to the first internal and external panels and to the second internal and external panels.

BRIEF DESCRIPTION OF THE DRAWINGS

FIG. 1 is a perspective view illustrating a preferred embodiment of a cart of the present invention.

FIG. 2 is a perspective view illustrating the side panel construction of the cart of FIG. 1.

FIG. 3 is a top view of the side panel construction of FIG. 2.

DETAILED DESCRIPTION OF THE PREFERRED EMBODIMENT

Figure 4:
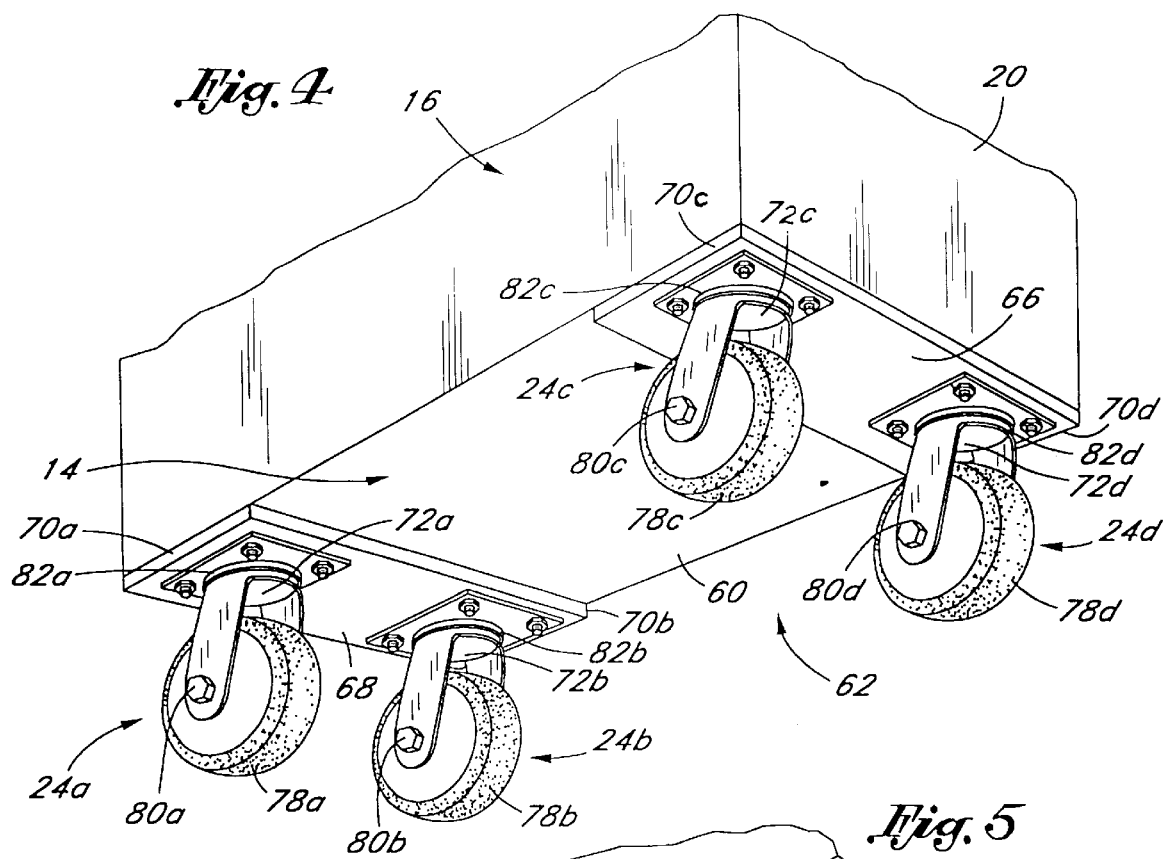
FIG. 4 is a perspective view illustrating the bottom wheel mount of the cart of FIG. 1.

Referring now to the drawings in more detail, FIGS. 1 and 4 illustrate a preferred embodiment of the cart 10 adapted to receive modular containers and shelves in a variety of arrangements. The cart 10 has a generally rectangular box-like construction with a top panel assembly 12, a bottom panel assembly 14, two vertical side panel assemblies 16 and 18, and a vertical back panel 20. The bottom panel assembly 14 is spaced below the top panel assembly 12. The two vertical side panel assemblies 16 and 18 are disposed opposite and spaced from each other, extending between and connected to the top panel assembly 12 and bottom panel assembly 14. The vertical back panel 20 extends between and is connected to the top and bottom panel assemblies 12 and 14, and extends between and is connected to the two side assemblies 16 and 18. The connection between the panels can utilize any method known to those skilled in the art, including the use of welding or fasteners. Four wheel units 24a, 24b, 24c, and 24d are mounted at the bottom of the bottom panel assembly 14, as best seen in FIG. 4.

FIGS. 1–3 show the details of the construction of the side panel assembly 16. The side panel assembly 18, the details of which are not illustrated, desirably is a mirror image of the side panel assembly 16. It is understood, though the details of the side panel assembly 18 are not separately described, that they are identical to the details of the side panel assembly 16 except that they are mirror images of each other, as illustrated in FIG. 3. For convenience, identical components in the side panel assembly 18 will be identified by the same reference number as those in the side panel assembly 16 but noted with a prime (').

Advantageously, the side panel assembly 16 shown in FIG. 2 has a double-panel construction comprising an outer panel 28 and an inner panel 30, which are desirably formed of sheet material and have the same dimension, and disposed generally parallel to each other. The outer panel 28 is preferably spaced from and disposed external of the inner panel 30 to protect the inner panel 30. The double-panel construction adds substantial strength and stiffness to the cart 10, making it suitable for storing heavy objects.

The inner panel 30 serves as a support panel for receiving and supporting edges of articles 31 such as trays, containers, or shelves inserted between the two inner side panels 30 and 30'. FIG. 1 shows some of the articles 31 partially pulled out in the front 32 of the cart 10. The width of these trays or other articles 31 is approximately equal to the distance between the two interior side panels 30 and 30'. To support these articles, the inner panel 30 has support members 36 disposed at the interior side, as best seen in FIGS. 2 and 3. These support members 36 preferably comprise vertically spaced horizontal ledges 38 struck out inwardly from the inner panel 30 and arranged into a set of vertical ledge-spacings between neighboring horizontal ledges 38. The struck-out ledges 38 are cantilevered at one side to the inner panel 30, forming what is known as a knock-down construction. The ledges 38 are preferably punched out of the inner panels 30, 30', and bent into a generally horizontal position. Alternatively, the free edges of the ledges 38, 38' could be cut into the panels 30, 30' and the ledges 38, 38' bent into position.

The knock-down construction provides stronger support for the articles 31 than one in which horizontal ledges (not shown) are fastened to a side wall with screws or rivets or attached in similar ways. The knock-down construction also provides smoother surfaces less susceptible to corrosion and entrapment of debris than ledges held with fasteners. The present cart 10 has the advantages of the knock-down construction. As shown in FIGS. 2 and 3, the two free corners 40a and 40b of each ledge 38 are desirably chamfered to eliminate sharp corners. The chamfered corners 40a and 40b facilitate easy receipt of trays and other articles 31 into the cart 10, are easier to manufacture, and eliminate high stress concentration of sharp corners.

The inner panel 30 preferably has a uniform vertical ledge-spacing between neighboring horizontal ledges 38 as illustrated in FIG. 2. The uniform ledge-spacing adds flexibility by allowing the trays, containers, shelves, or other articles 31 to be moved incrementally up or down and makes the cart 10 more adaptable for receiving a variety of such articles. The cart 10 hence can hold modular containers and shelves in a variety of sizes and arrangements. The spacing is desirably substantially smaller than the depth of the cart 10 measured from the front 32 to the back panel 20, and is more desirably approximately twice the width of the ledges 38. In the embodiment shown, the ledges 38 and 38' are desirably about 12½ inches long, ¾ inches wide, and 3/32 inches thick. A spacing of about 14 1/12 inches between the ledges 38 and between the ledges 38' is preferred. This results in a relatively close spacing between adjacent ledges 38. This is useful because a tray 31 will often tilt downwardly from the ledges 38 on which the edges of the tray 31 rest as the tray 31 is pulled out partially. The close adjacent ledges 38 prevent over-tilting and tipping over of the tray 31 by constraining the edges of the tray 31 between adjacent ledges 38.

Referring to FIGS. 2 and 3, the support members 36 are desirably arranged into at least two, and more desirably only two, vertical columns 46 and 48 spaced from each other. A vertical strip 50 of the sheet material of the inner panel 30 is located between the vertical columns 46 and 48 and is free of horizontal ledges 38. The width of the columns 46 and 48 is desirably the same and the ledge-spacing of the ledges 38 is preferably the same in both columns 46 and 48. In the embodiment shown, the width of the columns 46 and 48 is preferably about 12½ inches. The width of the vertical strip 50 is desirably smaller than the width of the columns 46 and 48. Preferably the width of the strip 50 is about 1¾ inches. This multi-column arrangement of the support members 36 has a significant advantage. As the ledges 38 are struck out of the inner panel 30, the inner panel 30 loses some of its strength and rigidity, especially in the vertical direction. The vertical strip 50 between the two columns 46 and 48 provides strength and rigidity in the vertical direction not found in traditional knock-down designs that do not have multiple columns.

To further increase such strength and rigidity, more than two columns of support members 38 can be created to form more than one vertical strip (not shown). In such a construction, the width of each of the columns (not shown) is desirably the same. Furthermore, the multi-column arrangement allows the knock-down design to be used for very long trays or other articles 31 measured from the front 32 to the back panel 20. The side panels (not shown) in a traditional knock-down cart having large depth have low vertical stiffness which limits its utility. The multi-column arrangement solves that problem by maintaining relatively high vertical stiffness for very deep carts by providing multiple vertical strips (not shown) between neighboring columns similar to the strip 50 shown in FIG. 2.

Advantageously, the vertical strip 50 further provides an attachment area for attaching a reinforcement or stiffening member such as an elongated bracket. FIGS. 2 and 3 show a bracket 54 with a C-shaped cross-section. The bracket 54 extends from near the top panel assembly 12 to near the bottom panel assembly 14. The bracket 54 is disposed between the inner panel 30 and outer panel 28 to provide further strength and rigidity, especially in the vertical direction. The bracket 54 has high vertical stiffness and can be attached to the inner panel 30 at the vertical strip 50 in any available ways known to those skilled in the art, such as fastening with fasteners 56 such as rivets and screws, or spot welding. The bracket 54 is desirably also fastened to the outer panel 28 in a similar way. The two ends of the elongated bracket 54 desirably are also welded or otherwise attached to the top and bottom panel assemblies 12 and 14. In this configuration, the stiffening bracket 54 adds its stiffness and couples the stiffness of the outer panel 28 to that of the inner panel 30, thereby reinforcing the inner panel 30 to make the overall side panel assembly 16 very rigid and strong, and able to store heavy objects. The construction is simple and does not require a lot of extra material or added weight.

This bracket-reinforced, double-panel, multi-column configuration presents an effective, economical, and efficient construction of a simple cart 10 that is strong and sturdy. It is understood that more than two panels and more stiffening brackets (not shown) can be used to form the side panel assemblies 16 and 18. The preferred embodiment disclosed, however, is simple and effective.

Turning now to FIG. 4, the bottom panel assembly 14 desirably has a bottom planar panel 60 with a wheel mounting component 62, which advantageously comprises a pair of generally parallel and generally rectangular mounting strips 66 and 68. The strip 68 stretches between two adjacent corners 70a and 70b of the cart 10. Similarly, the strip 66 stretches between two adjacent corners 70c and 70d of the bottom panel 60. The mounting strips 66 and 68 are about 3/16 inches thick and 4¾ inches wide for the illustrated cart 10. They are desirably made of steel.

The mounting strips 66 and 68 provide a wheel mount 72a, or 72b, or 72c, or 72d adjacent each corner 70a, 70b, 70c, or 70d of the bottom panel 60. Nuts and bolts 84a fasten the casters 24 to strip 68 and bottom panel 60. Mounting the wheels adjacent the corners 70a, 70b, 70c, and 70d provides good stability and support for the cart 10. The two mounting strips 66 and 68 not only provide wheel mounts 72a, 72b, 72c, and 72d for the four wheel units 24a, 24b, 24c, and 24d, but also add strength and stiffness to the bottom panel assembly 14, while using a relatively small amount of additional material and adding insubstantial cost. This configuration is preferred over one employing four separate mounting plates disposed at four corners (not shown) because the mounting strips 66 and 68 add substantially more strength and stiffness.

Figure 5:
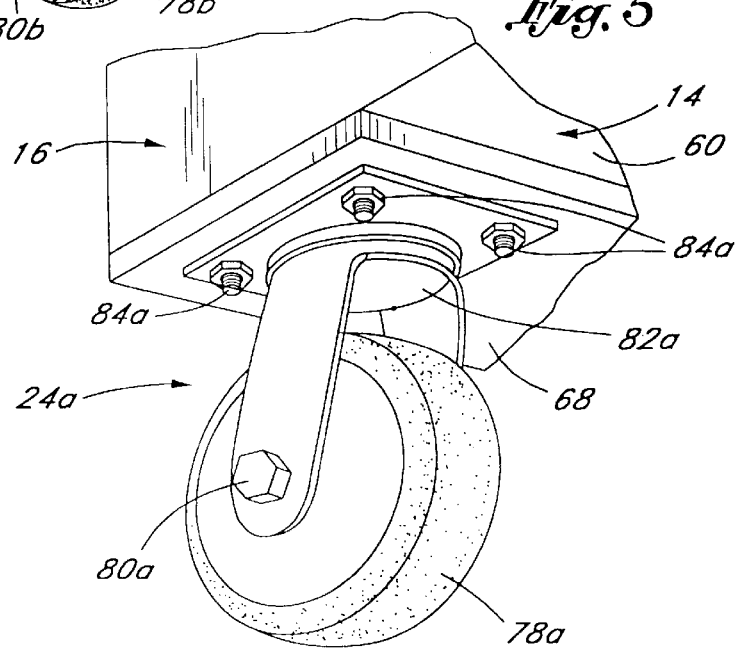
FIG. 5 is a close-up perspective view of a portion of the wheel mount of FIG. 4.

The wheel units are desirably identical caster wheel units 24a, 24b, 24c, and 24d for easy manipulation and movement. They are illustrated in FIG. 4 and more clearly seen in the close-up view of FIG. 5. The caster wheel unit 24a in FIG. 5 is a standard item which comprises a generally circular wheel 78a rotatably attached by a nut and bolt assembly 80a to and supported by a swivel 82a, which is rotatably attached by another nut and bolt assembly 84a to the mounting strip 68. The wheel 78a rotates with the swivel 82a about a first axis and also rotates about a second axis which is generally perpendicular to the first axis. Caster wheel units 24b, 24c, and 24d are the same as wheel unit 24a. Thus, wheels 73b, 78c and 78d are similarly attached by nut and bolt assemblies 80b, 80c and 80d respectively, to swivels 82b, 82c and 82d. Other caster-wheel designs and other available methods of attaching caster wheels that are known to those skilled in the art can be used.

In another embodiment (not shown), a cart has two caster wheel units similar to unit 24a adjacent the two corners 70a and 70b near the front 32 of the cart 10. Adjacent the corners 70c and 70d near the back panel 20 of the cart are two regular wheels (not shown) oriented in a fixed direction. This configuration may be more easily manipulable in certain applications.

Referring now to FIG. 1, the top panel assembly 12 desirably has a planar sheet panel 88. A handle 90 is desirably provided at the front of the top panel 88 for ease of moving the cart 10. The handle 90 can be attached to the front of the top panel 88 by any method known to those skilled in the art. FIG. 1 shows the handle 90 attached by rivets 92.

In another embodiment (not shown), a cart does not have the back panel 20 discussed above, but has open front and back. In such a cart, the trays and other articles 31 can be inserted through and removed from the front or the back of the cart.

In the preferred embodiment of the cart 10 shown in FIGS. 1–5, the cart 10 is especially suited for holding tools and repair parts and has dimensions as follows. The depth measured from the front 32 to the back panel 20 is about 29 inches. The width between the two side panel assemblies 16 and 18 is about 16 inches. The height between the top and bottom panel assemblies 12 and 14 is about 35 inches. Other dimensions can be adapted to different application, depending on the size and weight of the items stored. The material used in making the cart 10 can also be chosen for the specific use. For the cart 10 illustrated and used for storing tools and repair parts, aluminum or stainless steel is often employed. The thickness can be varied to accommodate the load carried by the various components of the cart 10. Other materials such as plastic and composites can also be used.

The cart 10 as described has a simple construction and yet is strong, sturdy, and adaptable to receive modular trays, containers, shelves, and other articles 31 in a variety of arrangements, including those that carry heavy objects and have substantial depth.

It will be understood that the above-described arrangements of apparatus and the methods therefrom are merely illustrative of applications of the principles of this invention and many other embodiments and modifications may be made without departing from the spirit and scope of the invention as defined in the claims.

What is claimed is:

1. A cart comprising:

a generally rectangular bottom panel having four corners and bottom wheel mounts adjacent said corners with wheels mounted thereon;

a generally rectangular top panel spaced above said bottom panel; and two vertical side panel assemblies disposed opposite each other, and extending between and connected to said top and bottom panels, each of said side panel assemblies having an outer side panel spaced from an inner side panel and a stiffener disposed between and connected to said outer and inner side panels, each of said inner side panels being formed of planar sheet material and having two columns of support members, said column comprising horizontal ledges struck out inwardly from said sheet material of said inner side panel, said two columns being horizontally spaced from each other and forming therebetween a vertical strip of said inner side panel.

2. The cart of claim 1, wherein the ledges in each column are evenly spaced vertically.

3. The cart of claim 1, wherein each of the ledges is generally rectangular and has two free corners that are chamfered.

4. The cart of claim 1, further comprising a vertical back panel extending between and connected to the top and bottom panels, and extending between and connected to the two vertical side panel assemblies.

5. The cart of claim 1, wherein the stiffener is attached to the inner and outer side panels and extends vertically along the vertical strip of the inner side panel.

6. The cart of claim 5, wherein the stiffener is a C-shaped bracket.

7. The cart of claim 1, wherein the bottom wheel mounts comprise two generally parallel and rectangular strips, each said strip extends between two adjacent corners of the bottom panel, and the wheels are caster wheels rotatably mounted onto said strips adjacent said corners.

8. A cart comprising:
a top panel;
a bottom panel spaced below said top panel; and
two side wall assemblies opposite each other, and extending between and connected to said top and bottom panels, each of said side wall assemblies including a support panel formed of planar sheet material and at least two columns of vertically spaced horizontal ledges struck out inwardly from said sheet material of said support panel, said ledges being adapted to receive and support edges of articles inserted between said inner side panels, any adjacent two of said columns being separated by a planar strip of said sheet material, each said planar strip having an elongated stiffener attached thereto, said stiffener extending between and connected to said top and bottom panels.

9. The cart of claim 8, further comprising a back panel extending between and connected to the top and bottom panels, and extending between and connected to the two side wall assemblies.

10. The cart of claim 8, wherein the ledges have a uniform vertical ledge-spacing between neighboring ledges.

11. The cart of claim 8, wherein each of the vertical side wall assemblies further comprises at least one cover panel disposed external of the support panel, said cover panel being attached to the elongated stiffener which is attached to said support panel.

12. A cart comprising:
receiving means for receiving a plurality of articles;
support means for supporting edges of said articles, said support means including vertically spaced horizontal ledges arranged into a plurality of horizontally spaced sections formed on an inner panel; and
reinforcing means for reinforcing said support means, including a stiffener connected to said inner panel and further connected to an outer panel adjacent to said inner panel by fastening means to couple the stiffness of the outer panel to the inner panel.

13. The cart of claim 12, wherein the receiving means includes a plurality of planar sheet panels struck out to form the ledges.

14. The cart of claim 13, wherein the reinforcing means comprises at least one elongated bracket.

15. The cart of claim 14, wherein the receiving means includes a first set of two horizontally spaced planar sheet panels disposed opposite a second set of two horizontally spaced planar sheet panels, and the reinforcing means comprises a first elongated bracket disposed between and attached to said first set of planar sheet panels and a second elongated bracket disposed between and attached to said second set of planar sheet panels.

16. A method of making a cart, comprising the steps of:
forming a bottom panel;
attaching a plurality of wheels to a bottom side of said bottom panel;
forming a top panel and disposing said top panel above said bottom panel;
forming a right-side panel assembly which extends between said top panel and said bottom panel;
attaching said right-side panel assembly to said top panel and said bottom panel;
forming a left-side panel assembly which extends between said top panel and said bottom panel;
attaching said left-side panel assembly to said top panel and said bottom panel;
said right-side panel assembly comprising an outer right-side panel spaced from an inner right-side panel and a right-side stiffener disposed between and attached to said outer and inner right-side panels by fastening means to couple the stiffness of the outer panel to the inner panel, said inner right-side panel having two right-side columns of support members, said right-side columns being horizontally spaced from each other and forming a right-side strip of said inner right-side panel therebetween; and
said left-side panel assembly comprising an outer left-side panel spaced from an inner left-side panel and a left-side stiffener disposed between and attached to said outer and inner left-side panels by fastening means to couple the stiffness of the outer panel to the inner panel, said inner left-side panel having two left-side columns of support members, said left-side columns being horizontally spaced from each other and forming a left-side strip of said inner left-side panel therebetween.

17. The method of claim 16, further comprising:
forming a back panel which extends between the top and bottom panels and between the right-side and left-side panel assemblies;
attaching said back panel to the top and bottom panels; and
attaching said back panel to the right-side and left-side panel assemblies.

18. The method of claim 16, wherein the inner right-side and left-side panels are formed of planar sheet material, and the columns of support members comprise vertically spaced horizontal ledges struck out inwardly from said sheet material of said inner right-side and left-side panels.

19. The method of claim 18, wherein the horizontal ledges in each column are evenly spaced vertically.

20. A method of making a cart, comprising the steps of:
forming a first external panel;
forming a first internal panel which is spaced inwardly from said first external panel, being generally parallel thereto;
striking out inwardly from said first internal panel at least two columns of vertically spaced horizontal ledges, any adjacent two of said columns being separated by a planar strip of said first internal panel;
coupling said first internal and external panels by at least one stiffening member disposed therebetween;
forming a second external panel which is spaced from said first internal and external panels;
forming a second internal panel which is spaced inwardly from said second external panel toward said first internal panel, being generally parallel to said second external panel;
striking out inwardly from said second internal panel at least two columns of vertically spaced horizontal ledges, any adjacent two of said columns being separated by a planar strip of said second internal panel;

coupling said second internal and external panels by at least one stiffening member disposed therebetween;

forming a top panel extending between and connected to said first internal and external panels and to said second internal and external panels; and forming a bottom panel spaced below said top panel, and extending between and connected to said first internal and external panels and to said second internal and external panels.

21. The method of claim 20, wherein the first internal panel and second internal panel have a same number of columns of ledges.

22. The method of claim 21, wherein the horizontal ledges in each column are evenly spaced vertically.

23. The method of claim 20, wherein each of the horizontal ledges has two free corners that are chamfered.

24. The method of claim 20, wherein coupling said first internal and external panels includes attaching one stiffening member between said first internal and external panels along each planar strip of said first internal panel, and coupling said second internal and external panels includes attaching one stiffening member between said second internal and external panels along each planar strip of said second internal panel.

25. The method of claim 24, wherein each stiffening member is a C-shaped bracket.

26. The method of claim 20, further comprising a back panel extending between and connected to the top and bottom panels, and extending between and connected to the first external and internal panels and the second external and external panels.

* * * * *